United States Patent
Abe et al.

[19]

[11] Patent Number: 6,130,714
[45] Date of Patent: Oct. 10, 2000

[54] BRANCH IMAGE PICKUP AND VIEW SYSTEM

[75] Inventors: Tetsuya Abe; Takaaki Yano, both of Hokkaido; Takayuki Ito, Tokyo, all of Japan

[73] Assignee: Asahi Kogaku Kabushiki Kaisha, Tokyo, Japan

[21] Appl. No.: 08/869,640

[22] Filed: Jun. 4, 1997

[30] Foreign Application Priority Data

Jun. 6, 1996 [JP] Japan ................................. 8-144493

[51] Int. Cl.[7] ........................... H04N 5/225; G03B 13/06
[52] U.S. Cl. ........................ 348/335; 348/341; 396/382
[58] Field of Search ............................... 348/335, 340, 348/341; 396/84, 382, 379

[56] References Cited

U.S. PATENT DOCUMENTS

Re. 35,600   9/1997  Nozaki et al. ............................ 396/84
3,640,607    2/1972  Conrad ..................................... 359/790
4,525,744    6/1985  Nakamura et al. ...................... 348/341

*Primary Examiner*—Wendy Garber
*Assistant Examiner*—Andrew B. Christensen
*Attorney, Agent, or Firm*—Greenblum & Bernstein, P.L.C.

[57] ABSTRACT

A branch image pickup and view system includes an objective lens system, an image pickup surface which is adapted to pick up an image formed by the objective lens system, an eyepiece lens system through which an image formed by the objective lens system is viewed, an optical separation system provided behind the objective lens system to split light into a light bundle for the image pickup surface and a light bundle for the eyepiece lens system, a condenser lens provided in the optical path from said optical separation system to said optical eyepiece system to relay the image formed through the objective lens system to the eyepiece lens system, and an optical enlargement system which is provided between the optical separation system and the condenser lens.

6 Claims, 5 Drawing Sheets

SPHERICAL ABERRATION
CHROMATIC ABERRATION

TRANSVERSE CHROMATIC ABERRATION

ASTIGMATISM

DISTORTION

SPHERICAL ABERRATION
CHROMATIC ABERRATION

TRANSVERSE CHROMATIC ABERRATION

ASTIGMATISM

DISTORTION

BRANCH IMAGE PICKUP AND VIEW SYSTEM

BACKGROUND OF THE INVENTION

1. Field of the Invention

The present invention relates to a branch image pickup and view system having an optical image pickup system and a view finder system, for use with a CCD camera, such as a small video camera, a digital camera or an electronic still camera, etc.

2. Description of the Related Art

In recent CCD cameras, the picture plane size of the CCD as a light receiving element is reduced from ½" or ⅓" to ¼" or ⅕". Attempts have also been made to miniaturize CCD cameras. Moreover, the conventional CCD camera is usually provided with a liquid crystal (LC) finder and/or an optical view finder as a means for visually confirming images to be picked up. There are various types of optical view finders, such as a view finder independent from the optical image pickup system or a branch view finder bifurcated therefrom.

The LC finder has drawbacks such as that it consumes a large amount of electrical power, thus resulting in reduced service life of a battery to be used; the movement of the images displayed in the picture plane is discontinuous, and the resolution is lower than that of the optical view finder.

In an optical view finder independent from the optical image pickup system, there is a difference (parallax) for an object which is located at an object distance other than a specific or reference object distance, between the photographing range of the image pickup system and the view range of the view finder.

The branch view finder bifurcated from the image pickup system has no parallax but has drawbacks such as that it is difficult to meet the requirements of miniaturization and ease of viewing through the finder. If the picture plane size of the image pickup system (CCD) is reduced to miniaturize the view finder, the picture plane size of the primary image forming surface is also reduced in the bifurcated light path of the optical view finder, and an apparent emission angle (angle of view) becomes small, so that the image to be viewed is made small, thus resulting in difficulty in observation through the finder.

If the focal length of the eyepiece is reduced to increase the apparent angle of view, pupil diameter and eye relief are reduced, and hence a vignetting tends to occur even due to a slight movement of the eye, so that a clear image cannot be viewed through the view finder.

SUMMARY OF THE INVENTION

It is an object of the present invention to provide a bifurcated optical image pickup and view system having a small image pickup system and an optical view finder through which an image can be clearly viewed and which is bifurcated from the image pickup system.

To achieve the object mentioned above, according to the present invention, there is provided a branch image pickup and view system comprising an optical objective system, an image pickup surface adapted to pick up an image formed by the optical objective system, an optical eyepiece system through which an image formed by the optical objective system is viewed, an optical separation system provided behind the optical objective system to split a bundle of light into a light bundle for the image pickup surface and a light bundle for the optical eyepiece system, a condenser lens which is provided in the optical path from the optical separation system to the optical eyepiece system to relay the image formed by the optical objective system to the optical eyepiece system, and an optical enlargement system provided between the optical separation system and the condenser lens.

Preferably, the branch image pickup and view system satisfies the requirement defined by the formula (1) below;

$$1.4 < M_{R-C} < 3.0 \tag{1}$$

wherein "$M_{R-C}$" represents a resultant lateral magnification of the optical enlargement system and the condenser lens.

The optical enlargement system preferably comprises a negative biconcave lens. The condenser lens of positive power preferably comprises a positive biconvex lens which is provided, on the surface that is located away from the optical enlargement system, with a convex surface having a convexity larger than that of the other surface.

The branch image pickup and view system further comprises an optical image erection system that is provided between the optical objective system and the optical eyepiece system. The optical image erection system comprises an optical separation system, which comprises a beam splitter, and a prism having three reflection surfaces The present disclosure relates to subject matter contained in Japanese Patent Application No. 8-144493 (filed on Jun. 6, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1A:
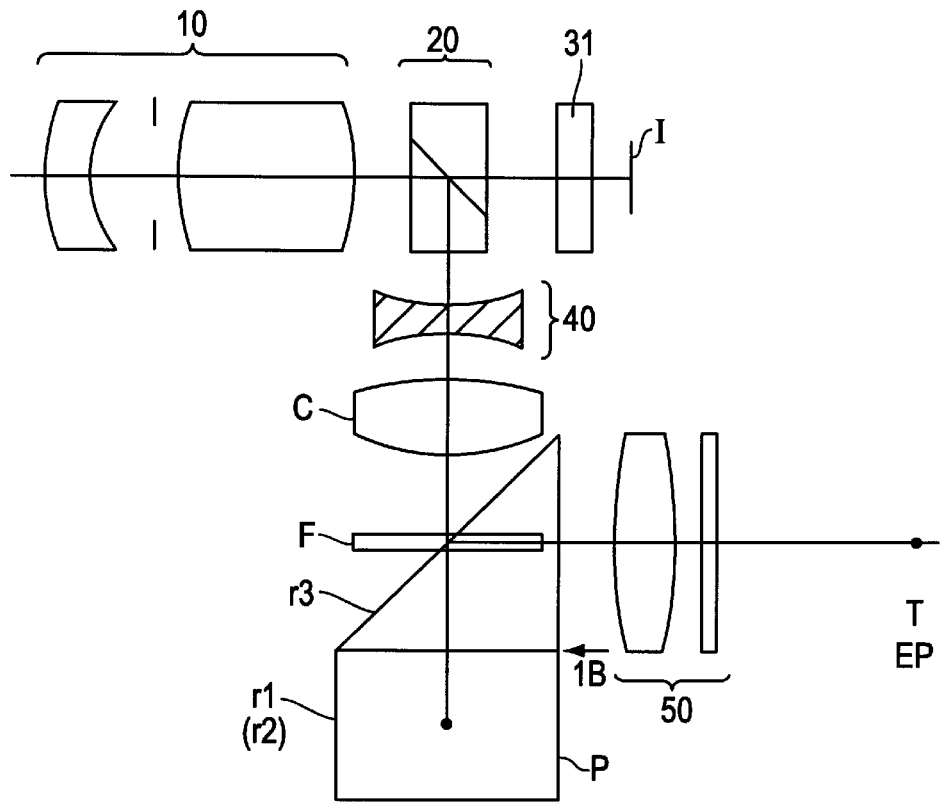
FIG. 1A is a schematic view of a branch image pickup and view system according to the present invention.
Figure 1B:
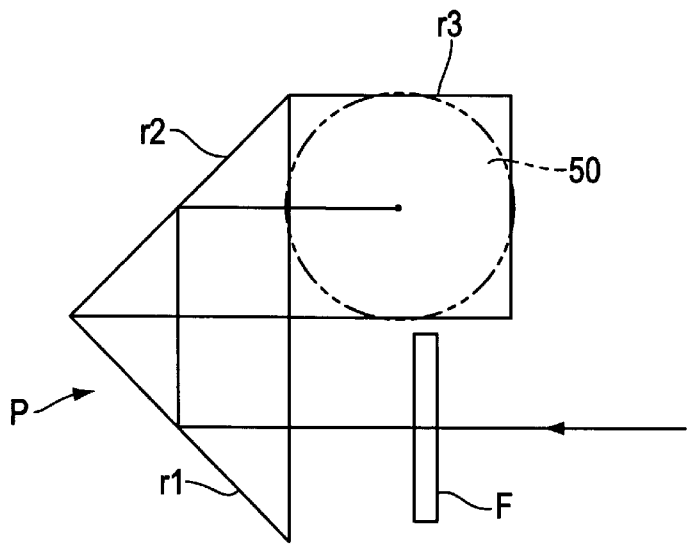
FIG. 1B is a view from an arrow 1B in FIG. 1A, which shows a prism and a field frame.

The branch image pickup and view system according to the present embodiment comprises of an objective lens system 10, an optical separation system (beam splitter) 20, and an image pickup surface I, in this order from the object side, as can be seen in FIG. 1A. An optical enlargement system 40 having a negative power, a condenser lens C, a field frame F, a prism P having three reflection surfaces r1, r2 and r3, and an eyepiece lens system 50 are arranged in this order from the object side, in the branch light path bifurcated by the optical separation system 20. Four reflecting surfaces consisting of the reflecting surface of the beam splitter 20 and the three reflection surfaces r1, r2 and r3 of the prism P comprise an optical erection system. "EP" designates the eye point of the eyepiece lens system 50. A glass cover 31 (including a filter) in the form of a flat plate is disposed in front of the image pickup surface. In FIG. 1A, the optical enlargement system 40 is represented by a negative single lens element.

In the branch image pickup and view system, the image formed by the objective lens system 10 is focused on the image pickup surface I. The image formed by the objective lens system 10, the optical enlargement system 40 and the condenser lens C is focused on the field frame F, which defines a primary image forming surface, so that the image can be viewed as an erect real image through the image erection system and the eyepiece lens system 50.

The optical enlargement system 40, which is provided between the optical beam separating system 20 located behind the objective lens system 10 and the condenser lens C which is adapted to relay the image to the eyepiece lens system 50, makes it possible to increase the size of the primary image forming surface of the eyepiece lens system 50 with respect to the picture plane size of the objective lens system, even if the latter is reduced. Thus, the focal length of the eyepiece lens system 50 can be increased to obtain a sufficient amount of apparent field of view, pupil diameter and eye relief, necessary for the normal optical view finder.

Namely, thanks to the optical enlargement system 40, the objective lens system and the CCD can be made small, the efficiency of the optical image pickup system can be enhanced, the observation of the image through the optical view finder can be made easy and the branch image pickup and view system can be miniaturized.

Formula (1) specifies a resultant lateral magnification of the optical enlargement system and the condenser lens. Since the structure of the optical image pickup system is the same as a conventional image pickup system, if the picture plane size of the CCD is reduced, it is preferable that the resultant lateral magnification be large enough to meet the requirement specified in formula (1) in order to increase the ratio between the size of the primary image forming surface of the eyepiece lens system and the picture plane size of the CCD. If the resultant lateral magnification is smaller than the lower limiting formula (1) the ratio between the picture plane size of the objective lens system and the picture plane size of the CCD is too small to achieve the object of the present invention. If the resultant lateral magnification exceeds the upper limit in formula (1), the apparent field of view and the eye relief can be effectively increased, but the aberration of the objective lens system is increased, and hence, aberrations such as chromatic aberration or curvature of the field are increased, which cannot be accepted with an optical view finder. To correct the aberrations, it is necessary to increase the number of lenses of which the optical enlargement system is made, thus leading to an increase in the length of the whole lens system, contrary to the need for miniaturization of the optical system.

If the resultant lateral magnification is larger than the lower limit in formula (1), the optical enlargement system is preferably made of a biconcave lens of a negative power, since the optical enlargement system generally has a large negative power. To correct the aberration of the negative biconcave lens, it is preferable that the condenser lens be made of a biconvex lens of a positive power which is provided, on a surface thereof away from the optical enlargement system, with a convex surface of a positive power whose convexity is larger than that of the other surface thereof (the surface that is adjacent to the optical enlargement system).

Two examples of numerical data (Embodiments 1 and 2) of a branch image pickup and view system according to the present invention will be discussed below.

<Embodiment 1>

Figure 2:
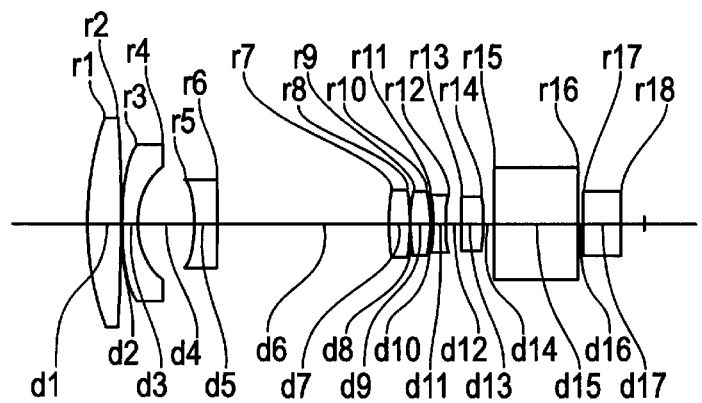
FIG. 2 is a conceptual view of a lens arrangement from an objective lens system to an image pickup surface, in a first embodiment of the present invention.
Figures 3A, 3B, 3C, 3D, 3E:
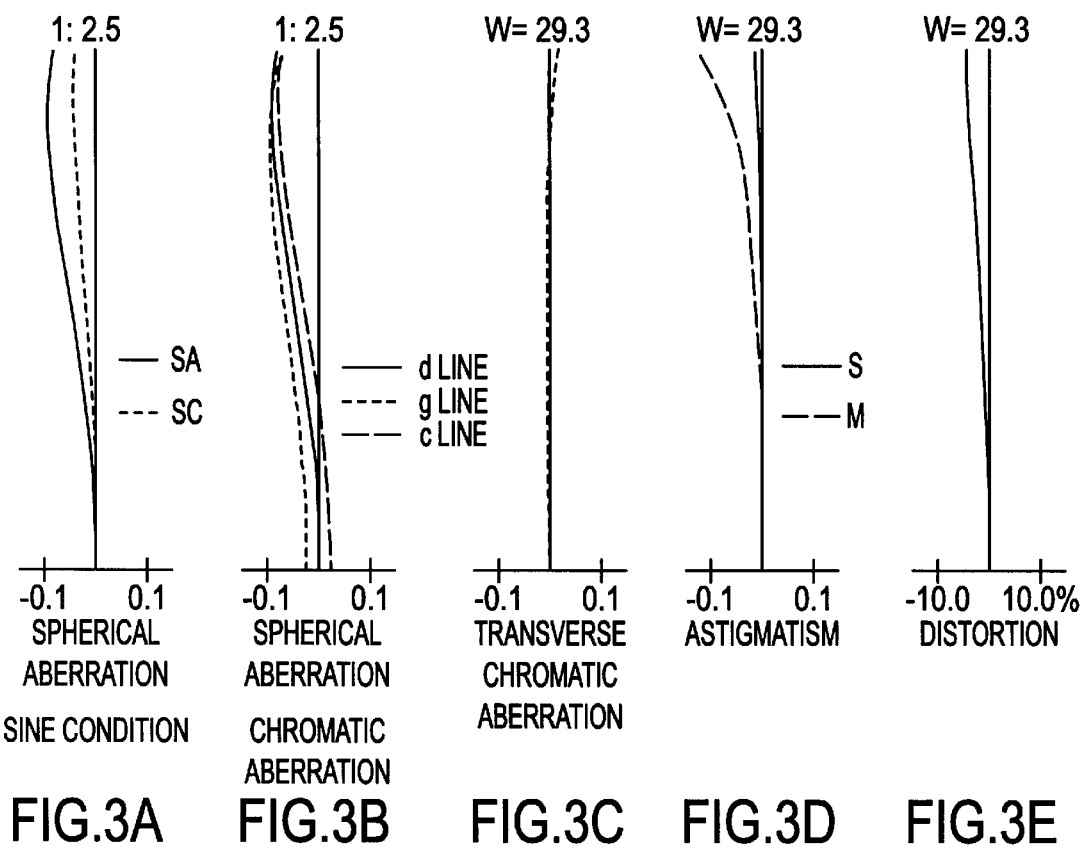
FIGS. 3A, 3B, 3C, 3D and 3E are aberration diagrams of the lens system shown in FIG. 2.
Figure 4:
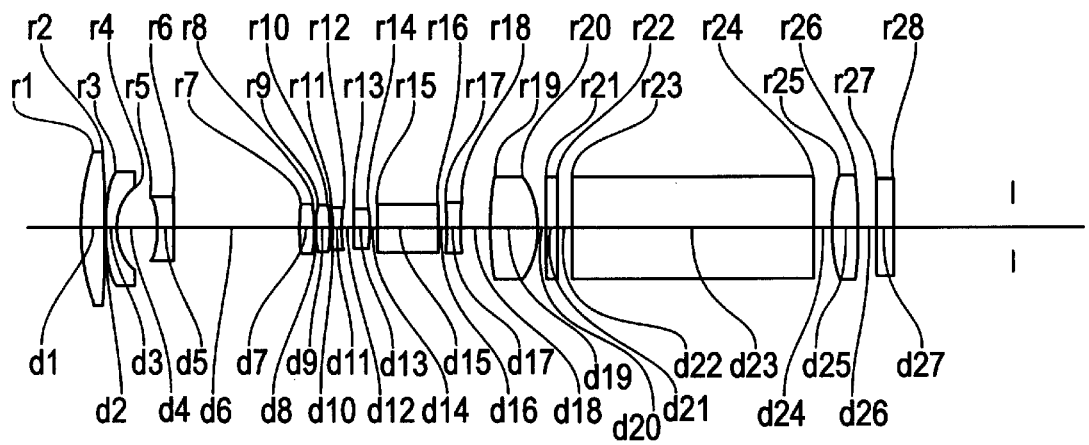
FIG. 4 is a conceptual view of a lens arrangement from an objective lens system to an eyepiece lens system, in a first embodiment of the present invention.
Figure 5A:
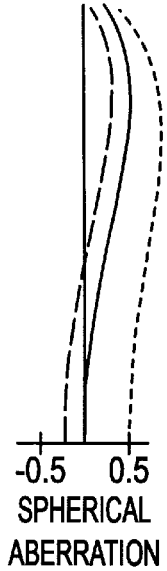
FIGS. 5A, 5B, 5C, and 5D are aberration diagrams of the lens system shown in FIG. 4.
Figure 5B:
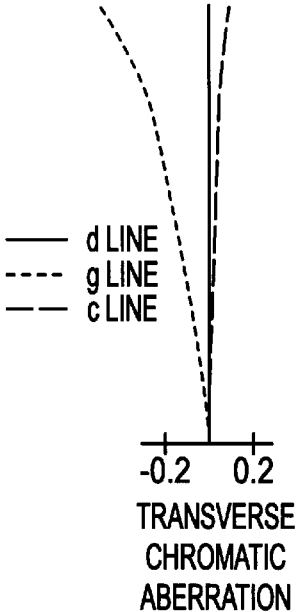
Figure 5C:
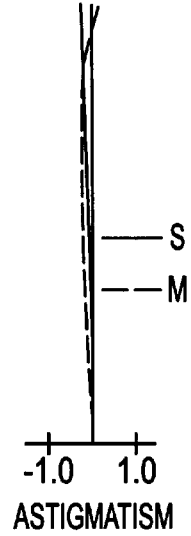
Figure 5D:
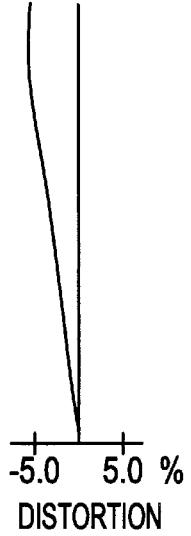

FIGS. 2 through 5 show a first embodiment of the present invention. FIG. 2 shows a lens arrangement of a lens system from the objective lens system 10 to the image pickup surface I, and FIGS. 3A through 3E show aberration diagrams thereof. FIG. 4 shows a lens arrangement of a lens system from the objective lens system 10 to the eyepiece lens system 50, and FIGS. 5A through 5D show aberration diagrams thereof. Tables 1 and 2 below show lens data of the lens system from the objective lens system 10 to the image pickup surface I, and lens data of the lens system from the beam separating optical element 20 to the eyepiece lens system 50, respectively.

In Table 2, no lens data of the lens surfaces Nos. 1 through 14, identical to those shown in Table 1 is shown. lens surfaces Nos. 15 and 16 in Tables 1 and 2 correspond to the beam separating optical element 20. Lens surfaces Nos. 17 and 18 in Table 1 correspond to the glass cover of the image pickup surface (CCD). Lens surfaces Nos. 17 and 18 in Table 2 correspond to the optical enlargement system. Lens surfaces Nos. 21 and 22 in Table 2 correspond to the field frame F; the lens surfaces Nos. 23 and 24 in Table 2 correspond to the prism P having three reflection surfaces, and the lens surfaces Nos. 25 through 28 in Table 2 correspond to the eyepiece lens system 50 (Nos. 27 and 28 correspond to the glass cover), respectively.

In the aberration diagrams, "SA" designates a spherical aberration, "SC" a sine condition, "d-line", "g-line" and "C-line" a chromatic aberration represented by the spherical aberration and lateral chromatic aberration at the respective wave lengths, "S" the sagittal rays, and "M" the meridional rays, respectively.

In the Tables and the drawings, "$F_{no}$" represents the F-number, "f" represents the focal length, "W" represents the half angle of view, "ER" represents the exit pupil diameter (eye ring), "B" represents the apparent field of view (half angle of view of emission angle), "$f_B$" represents the back focal distance, "$L_E$" represents the eye relief, "$f_{10}$, $f_{40}$, fc, $f_{50}$" represent the focal lengths of the objective lens system 10, the optical enlargement system 40, the condenser lens C and the eyepiece lens system 50, respectively, "R" represents the radius of curvature, "D" represents the lens thickness or the distance between the lenses, "$N_d$" represents the refractive index of the d-line, and "$\upsilon$" represents the Abbe number of the d-line, respectively. Tables 1 and 2 show lens data of the lens systems shown in FIG. 2 and FIG. 4, respectively.

TABLE 1

$F_{NO} = 1:2.5$
$F = 4.24$
$W = 29.3°$
$f_B = 2.00$
$f_{10} = 4.24$

| surface No. | R | D | $N_d$ | $v_d$ |
|---|---|---|---|---|
| 1 | 22.000 | 2.20 | 1.78472 | 25.7 |
| 2 | -167.733 | 0.10 | — | — |
| 3 | 15.328 | 1.00 | 1.77250 | 49.6 |
| 4 | 5.731 | 3.89 | — | — |
| 5 | -6.787 | 1.50 | 1.65160 | 58.5 |
| 6 | -56.816 | 11.55 | — | — |
| 7 | 11.004 | 1.30 | 1.75500 | 52.3 |
| 8 | -40.098 | 0.10 | — | — |
| 9 | 8.686 | 1.40 | 1.69680 | 55.5 |
| 10 | -15.529 | 0.19 | — | — |
| 11 | -8.663 | 0.80 | 1.68893 | 31.1 |
| 12 | 6.178 | 1.17 | — | — |
| 13 | 41.440 | 1.50 | 1.77250 | 49.6 |
| 14 | -7.889 | 0.80 | — | — |
| 15 | ∞ | 5.60 | 1.51633 | 64.1 |
| 16 | ∞ | 0.40 | — | — |
| 17 | ∞ | 2.50 | 1.51633 | 64.1 |
| 18 | ∞ | — | — | — |

TABLE 2

$W = 29.3°$
$B = 12.8°$
$L_E = 12.0$
$ER = 4.0$
$f_{40} = -5.30$
$f_C = 10.29$
$f_{50} = 20.21$
$M_{R-C} = 2.00$

| surface No. | R | D | $N_d$ | $v_d$ |
|---|---|---|---|---|
| 15 | ∞ | 5.60 | 1.51633 | 64.1 |
| 16 | ∞ | 0.80 | — | — |
| 17 | -8.154 | 1.00 | 1.83481 | 42.7 |
| 18 | 10.212 | 3.19 | — | — |
| 19 | 47.850 | 4.00 | 1.84666 | 23.8 |
| 20* | -10.239 | 1.03 | — | — |
| 21 | ∞ | 1.00 | 1.51633 | 64.1 |
| 22 | ∞ | 1.43 | — | — |
| 23 | ∞ | 23.00 | 1.49176 | 57.4 |
| 24 | ∞ | 1.80 | — | — |
| 25* | 13.683 | 2.50 | 1.49176 | 57.4 |
| 26 | -34.096 | 1.80 | — | — |
| 27 | ∞ | 1.50 | 1.49176 | 57.4 |
| 28 | ∞ | — | — | — |

*denotes rotation symmetrical aspherical surface.

The rotation symmetrical aspherical surface can be generally expressed as follows.

$$x = Ch^2 / \{1 + [1-(1+K)C^2h^2]^{1/2}\} + A4h^4 + A6h^6 + A8h^8 + \ldots$$

wherein h represents a height above the axis,
x represents a distance from a tangent plane of an aspherical vertex,
C represents a curvature of the aspherical vertex (1/r),
x represents a conic constant,
A4 represents a fourth-order aspherical factor,
A6 represents a sixth-order aspherical factor,
A8 represents an eighth-order aspherical factor.

Aspherical data
No.20: $K=0.0$, $A4=-0.84555 \times 10^{-3}$, $A6=0.30826 \times 10^{-4}$
$A8=-0.35788 \times 10^{-6}$, $A10=0.0$, $A12=0.0$
No.25: $K=0.0$, $A4=-0.10715 \times 10^{-3}$, $A6=-0.33418 \times 10^{-6}$
$A8=0.0$, $A10=0.0$, $A12=0.0$ <Embodiment 2>

Figure 6:
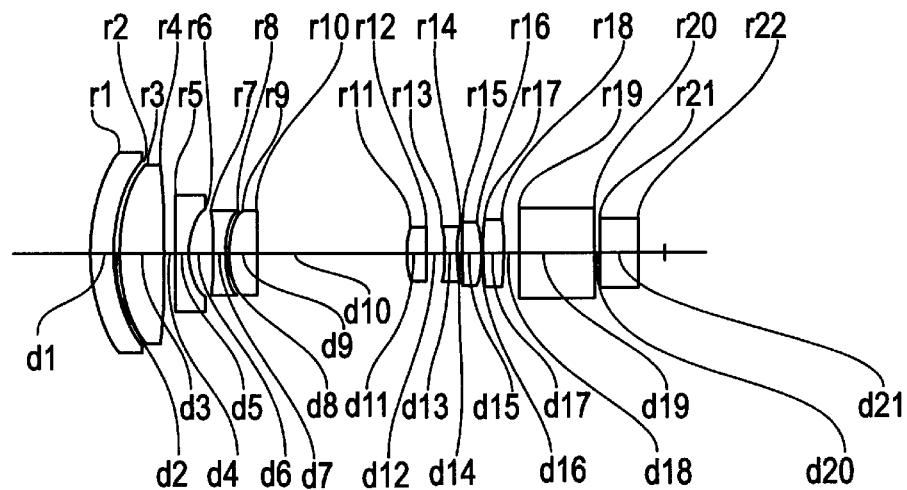
FIG. 6 is a conceptual view of a lens arrangement from an objective lens system to an image pickup surface, in a second embodiment of the present invention.
Figures 7A, 7B, 7C, 7D, 7E:
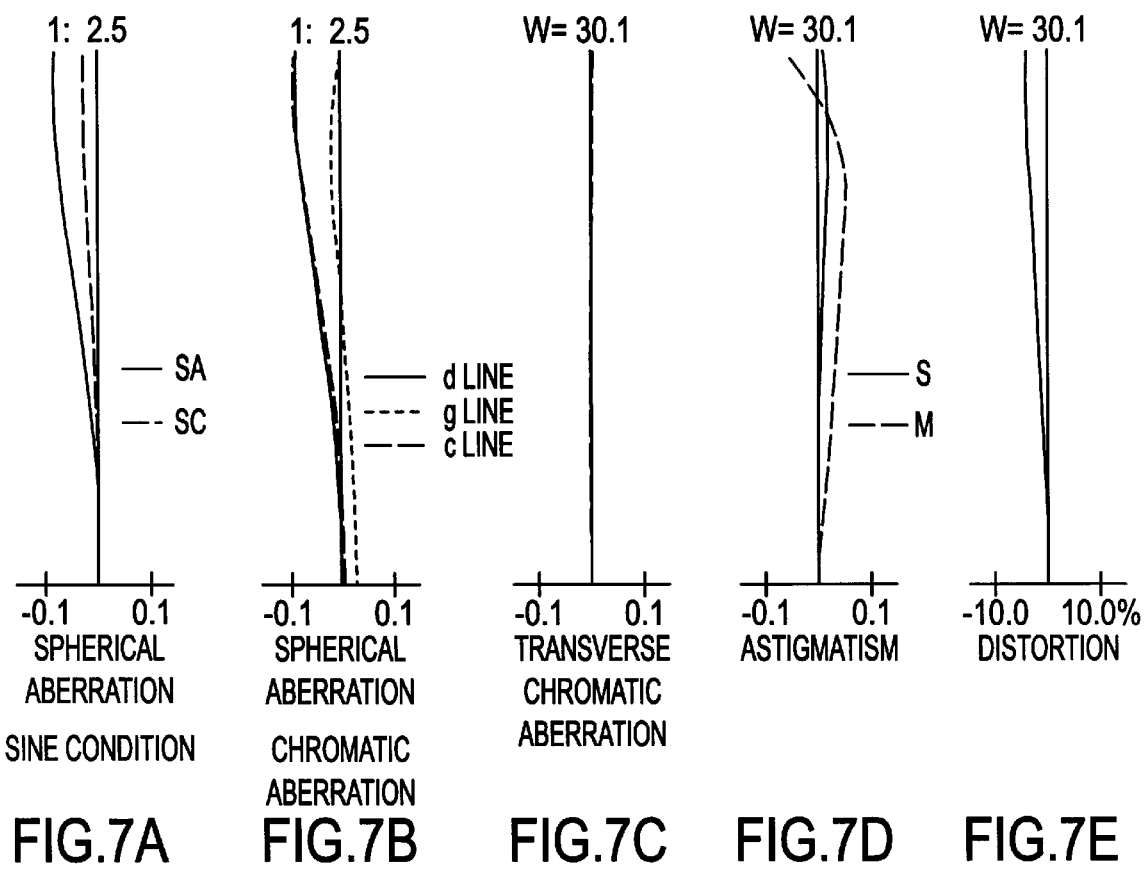
FIGS. 7A, 7B, 7C, 7D and 7E are aberration diagrams of the lens system shown in FIG. 6.
Figure 8:
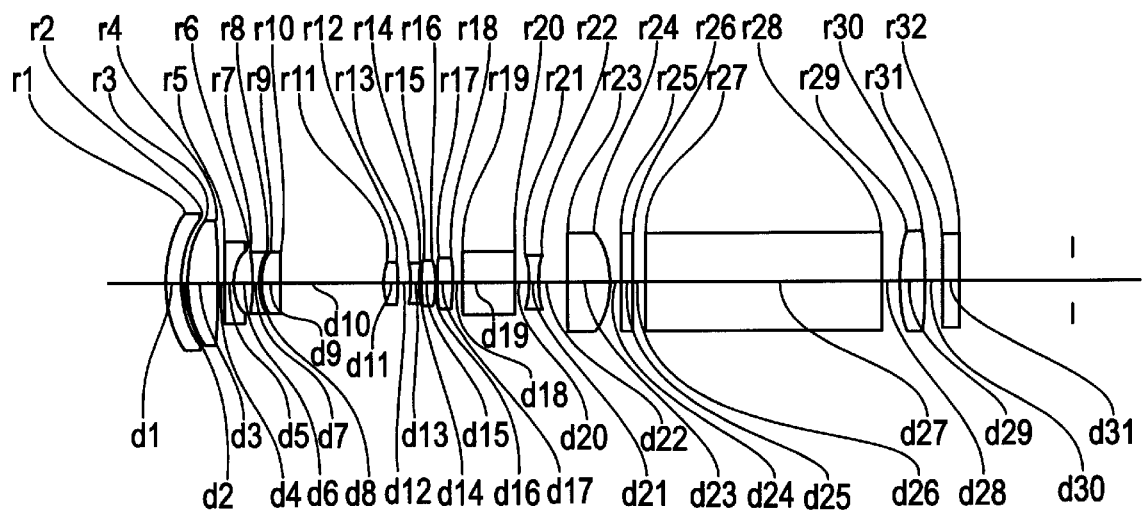
FIG. 8 is a conceptual view of a lens arrangement from an objective lens system to an eyepiece lens system, in a second embodiment of the present invention; and, FIGS. 9A, 9B, 9C, and 9D are aberration diagrams of the lens system shown in FIG. 8.
Figure 9A:
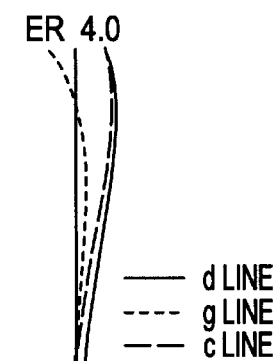
Figure 9B:
Figure 9C:
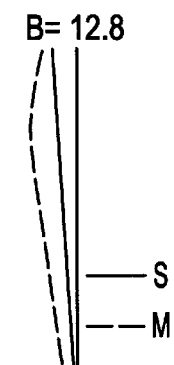
Figure 9D:
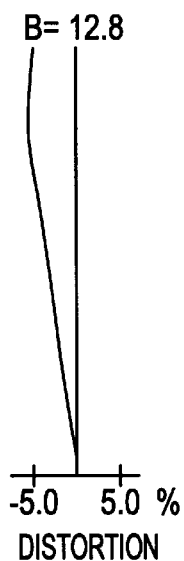

FIGS. 6 through 9 show a second embodiment of the present invention. FIG. 6 shows a lens arrangement of a lens system from the objective lens system 10 to the image pickup surface I, and FIGS. 7A through 7E show aberration diagrams thereof. FIG. 8 shows a lens arrangement of a lens system from the objective lens system 10 to the eyepiece lens system 50, and FIGS. 9A through 9D show aberration diagrams thereof. Tables 3 and 4 below show lens data of the lens system from the objective lens system 10 to the image pickup surface I, and lens data of the lens system from the objective lens system 10 to the eyepiece lens system 50, respectively.

In Table 4, no lens data of the lens surfaces Nos. 1 through 18 identical to those shown in Table 3 is shown. Lens surfaces Nos. 19 and 20 in Tables 3 and 4 correspond to the beam separating optical element 20. Lens surfaces Nos. 21 and 22 in Table 3 correspond to the glass cover of the image pickup surface (CCD) I. Lens surfaces Nos. 21 and 22 in Table 4 correspond to the optical enlargement system. Lens surfaces Nos. 23 and 24 in Table 4 correspond to the condenser lens. Lens surfaces Nos. 25 and 26 in Table 4 correspond to the field frame F. Lens surfaces Nos. 27 and 28 correspond to the prism P having three reflection surfaces, and lens surfaces Nos. 29 through 32 in Table 4 correspond to the eyepiece lens system 50 (Nos. 31 and 32 correspond to the glass cover), respectively.

TABLE 3

$F_{NO} = 1:2.5$
$F = 4.10$
$W = 30.1°$
$f_B = 2.00$
$f_{10} = 4.10$

| surface No. | R | D | $N_d$ | $v_d$ |
|---|---|---|---|---|
| 1 | 13.335 | 1.20 | 1.80518 | 25.4 |
| 2 | 9.757 | 0.44 | — | — |
| 3 | 11.554 | 3.10 | 1.60311 | 60.7 |
| 4 | -66.121 | 0.70 | — | — |
| 5 | ∞ | 0.80 | 1.83481 | 42.7 |
| 6 | 4.806 | 1.69 | — | — |
| 7 | -25.898 | 0.80 | 1.69680 | 55.5 |
| 8 | 7.983 | 0.10 | — | — |
| 9 | 7.247 | 1.70 | 1.84666 | 23.9 |
| 10 | ∞ | 10.03 | — | — |
| 11 | 5.953 | 1.30 | 1.77250 | 49.6 |
| 12 | ∞ | 1.23 | — | — |
| 13 | -7.328 | 0.80 | 1.78472 | 25.7 |
| 14 | 7.328 | 0.31 | — | — |
| 15 | -170.000 | 1.30 | 1.72916 | 54.7 |
| 16 | -7.672 | 0.10 | — | — |
| 17 | 13.219 | 1.50 | 1.72916 | 54.7 |
| 18 | -10.101 | 1.00 | — | — |
| 19 | ∞ | 5.00 | 1.51633 | 64.1 |
| 20 | ∞ | 0.40 | — | — |
| 21 | ∞ | 2.50 | 1.51633 | 64.1 |
| 22 | ∞ | — | — | — |

TABLE 4

$W = 30.1°$
$B = 12.5°$
$L_E = 12.0$
$ER = 4.0$
$f_{40} = -5.30$
$f_C = 10.29$
$f_{50} = 20.21$
$M_{R-C} = 2.00$

| surface No. | R | D | $N_d$ | $v_d$ |
|---|---|---|---|---|
| 19 | ∞ | 5.00 | 1.51633 | 64.1 |
| 20 | ∞ | 0.80 | — | — |
| 21 | -8.154 | 1.00 | 1.83481 | 42.7 |
| 22 | 10.212 | 3.19 | — | — |
| 23 | 47.850 | 4.00 | 1.84666 | 23.8 |
| 24* | -10.239 | 1.04 | — | — |
| 25 | ∞ | 1.00 | 1.51633 | 64.1 |

TABLE 4-continued

W = 30.1°
B = 12.5°
$L_E$ = 12.0
ER = 4.0
$f_{4O}$ = −5.30
$f_C$ = 10.29
$f_{5O}$ = 20.21
$M_{R-C}$ = 2.00

| surface No. | R | D | $N_d$ | $v_d$ |
|---|---|---|---|---|
| 26 | ∞ | 1.43 | — | — |
| 27 | ∞ | 23.00 | 1.49176 | 57.4 |
| 28 | ∞ | 1.80 | — | — |
| 29* | 13.683 | 2.50 | 1.49176 | 57.4 |
| 30 | −34.096 | 1.80 | — | — |
| 31 | ∞ | 1.50 | 1.49176 | 57.4 |
| 32 | ∞ | — | — | — |

Aspherical data
No.24: K=0.0, A4=−0.84555×10$^{-3}$, A6=0.30826×10$^{-4}$
A8=−0.35788×10$^{-6}$, A10=0.0, A12=0.0
No.29: K=0.0, A4=−0.10715×10$^{-3}$, A6=−0.33418×10$^{-6}$
A8=0.0, A10=0.0, A12=0.0

Table 5 below shows numerical values corresponding to formula (1) in the first and second embodiments.

TABLE 5

|  | Embodiment 1 | Embodiment 2 |
|---|---|---|
| Formula (1) | 2.00 | 2.00 |

As can be seen from Table 5, the first and second embodiments meet the requirement specified by formula (1). Also, the aberrations can be appropriately corrected.

As may be understood from the above discussion, according to the present invention, in a camera having an optical view finder bifurcated from the light path of the optical image pickup system, a branch image pickup and view system in which the image can be clearly viewed through the optical view finder without increasing the size of the optical image pickup system can be obtained.

What is claimed is:

1. A branch image pickup and view system, comprising:
an optical objective system;
an image pickup surface adapted to pick up an image formed by said optical objective system;
an optical eyepiece system through which an image formed by said optical objective system is viewed;
an optical separation system provided behind said optical objective system to split a bundle of light into a first light bundle for said image pickup surface and a second light bundle for said optical eyepiece system;
a condenser lens provided in an optical path from said optical separation system to said optical eyepiece system to relay an image formed by said optical objective system to said optical eyepiece system; and
an optical enlargement system provided between said optical separation system and said condenser lens, said view system satisfying the following:

$$1.4 < M_{R-c} < 3.0$$

"$M_{R-c}$" representing a resultant lateral magnification of said optical enlargement system and said condenser lens.

2. A branch image pickup and view system according to claim 1, wherein said optical enlargement system of a negative biconcave lens.

3. A branch image pickup and view system according to claim 1, wherein said condenser lens comprises a positive biconvex lens, a first surface of said condenser lens facing said optical enlargement system, another surface of said condenser lens facing away from said optical enlargement system, a radius of curvature of said another surface being smaller than a radius of curvature of said first surface.

4. A branch image pickup and view system according to claim 1, further comprising an optical image erection system provided between said optical objective system and said optical eyepiece system.

5. A branch image pickup and view system according to claim 4, wherein said optical image erection system comprises said optical separation system and a prism having three reflection surfaces.

6. A branch image pickup and view system according to claim 1, wherein said optical separation system comprises a beam splitter.

* * * * *

UNITED STATES PATENT AND TRADEMARK OFFICE
CERTIFICATE OF CORRECTION

PATENT NO. : 6,130,714
DATED : October 10, 2000
INVENTOR(S) : T. ABE et al.

It is certified that error appears in the above-identified patent and that said Letters Patent is hereby corrected as shown below:

On the cover of the printed patent, at Item [73], Assignee, "Asahi Kogaku Kabushiki Kaisha" should be --Asahi Kogaku Kogyo Kabushiki Kaisha--.

Signed and Sealed this

First Day of May, 2001

Attest:

NICHOLAS P. GODICI

*Attesting Officer*     *Acting Director of the United States Patent and Trademark Office*